United States Patent [19]

Cashmere

[11] Patent Number: 4,561,664
[45] Date of Patent: Dec. 31, 1985

[54] TOBOGGAN

[75] Inventor: Raymond A. Cashmere, Charlestown, Australia

[73] Assignee: Luckit Pty. Limited, Mayfield, Australia

[21] Appl. No.: 506,716

[22] Filed: Jun. 22, 1983

[30] Foreign Application Priority Data

Jun. 30, 1982 [AU] Australia ................ PF4651

[51] Int. Cl.⁴ .................... B62B 13/08
[52] U.S. Cl. .................... 280/18; 280/12 B; 280/21 R; 441/65; 441/79
[58] Field of Search ............ 280/18, 28, 21 R, 12 KL, 280/12 L, 12 B, 12 H, 12 R, 609; 114/291; 441/65, 67, 79

[56] References Cited

U.S. PATENT DOCUMENTS

| 2,139,513 | 12/1938 | Nelson et al. | 280/18 |
|---|---|---|---|
| 3,374,003 | 3/1968 | Fulsom | D21/229 |
| 3,580,598 | 5/1971 | de Pauw | 280/18 |
| 3,861,698 | 1/1975 | Greig | 280/11.13 Y |
| 3,937,482 | 2/1976 | Johnson | 280/18 |

FOREIGN PATENT DOCUMENTS

| 2532034 | 2/1977 | Fed. Rep. of Germany | 114/291 |
|---|---|---|---|
| 1321052 | 2/1963 | France | 280/12 B |
| 1413836 | 8/1965 | France | 280/18 |
| 2437850 | 10/1978 | France | |
| 2435956 | 5/1980 | France | 280/18 |

Primary Examiner—Joseph F. Peters, Jr.
Assistant Examiner—Mark C. Dukes
Attorney, Agent, or Firm—Herbert L. Boettcher

[57] ABSTRACT

A hand-toboggan to accommodate a seated or kneeling rider and having a bottom surface with a longitudinally extending medial portion and two opposite flanks upwardly and outwardly inclined from the medial portion, a pair of parallel longitudinally extending ribs bordering the medial portion, and a plurality of parallel inwardly curving ribs on each of said flanks to enable the rider to turn the toboggan in whichever direction he should lean.

10 Claims, 6 Drawing Figures

FIG. 2
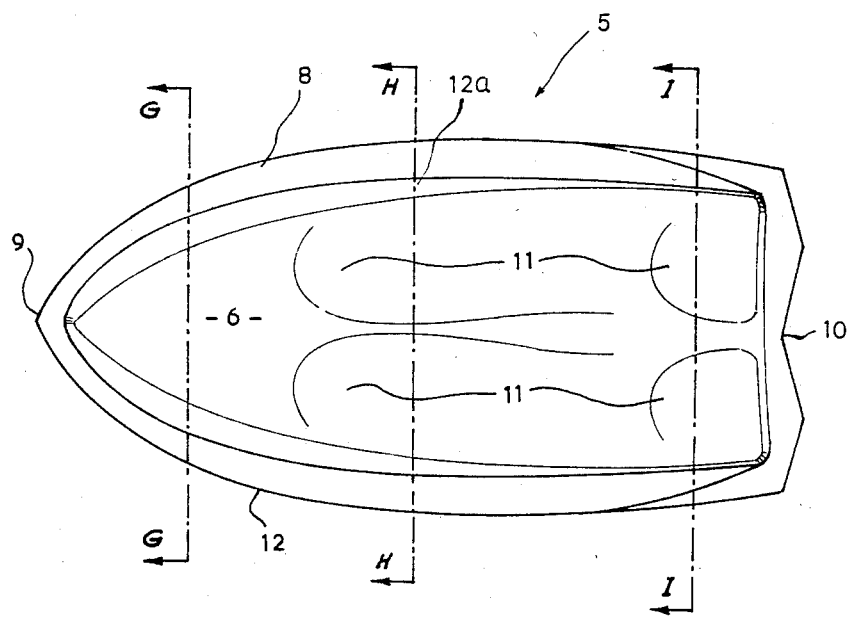
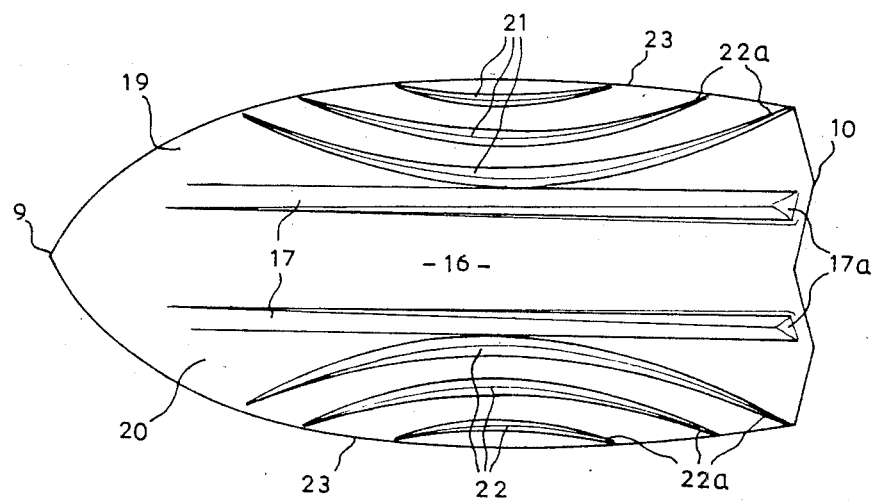
FIG. 3

TOBOGGAN

This invention relates to hand-toboggans, and more particularly to those of the kind constructed in the form of a skid, or slide, to serve as an amusement vehicle on snow slopes.

Snow hand-toboggans of this kind as opposed to sledges or sleighs do not possess runners and are generally provided as a dished platform with a generally flat bottom. Any ribbing at all provided in the bottom extends longitudinally. Especially on large gradients it is not uncommon for these vehicles to become uncontrollable due to lack of steering and many serious accidents occur involving not only the rider but bystanders and other tobogganists, and consequently these vehicles are prohibited on more and more supervised snow fields.

The principal object of the invention is to provide a hand-toboggan which permits the rider improved control of its steering.

To this end the invention in one general form provides a hand-toboggan having a body with an upper surface for supporting a rider, an outwardly dished bottom on the body which includes a longitudinally extending medial portion and opposite lateral flanks upwardly inclined from the plane thereof, said hand-toboggan being characterised in that said medial portion has substantially longitudinally extending protruding ribs, and one or more arcuate protruding ribs are provided in each of said flanks which curve from their ends inwardly towards said medial portion, to enable the tobogganist to steer in one direction or another by transferring his weight to an appropriate side of said toboggan.

The invention will be described in more detail with reference to the accompanying drawings, in which:

FIG. 2 is a plan view of such a vehicle;

FIG. 3 is a view from beneath thereof; and,

Figure 1:
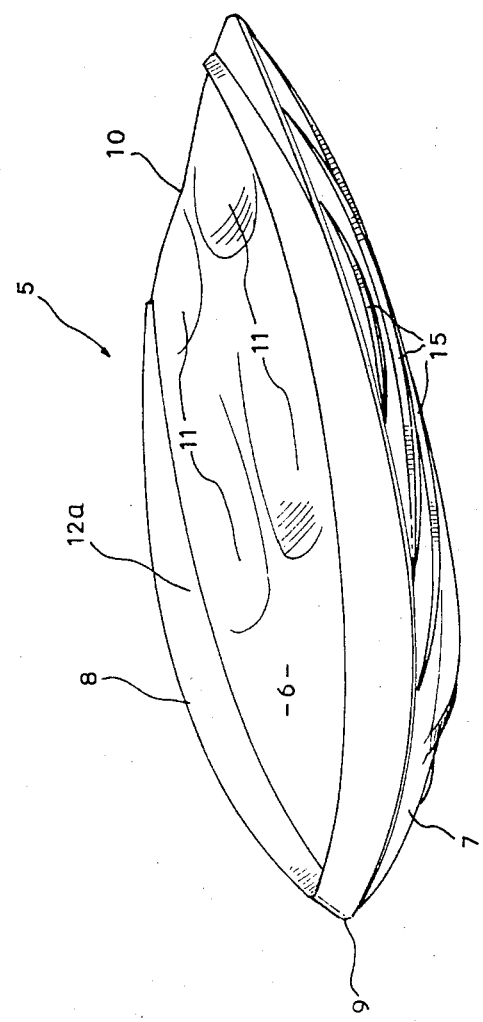
FIG. 1 is a perspective view of a toboggan constructed according to the principles of this invention.
Figure 4A:
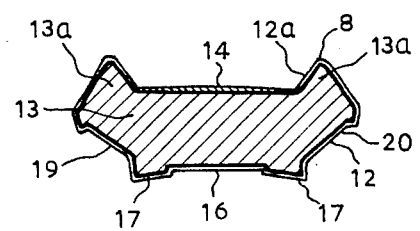

FIGS. 4a, b and c show sectional views of the vehicle as viewed on the lines G—G, H—H and I—I of FIG. 2, respectively.

Figure 4B:
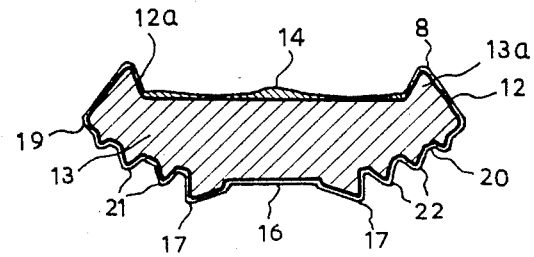
Figure 4C:
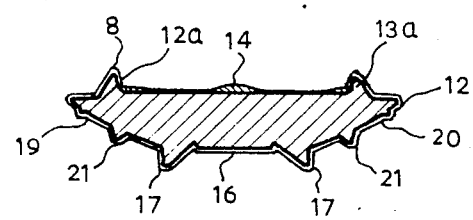

With reference to the drawings it will be seen that the toboggan 5 is composed of a body having an upper surface 6 and a lower, outwardly dished bottom 7. A gunwale 8 is raised above the upper surface, or deck, 6 and tapers downwardly towards the surface 6 from the front 9 to the back 10 of the toboggan 5. Knee and feet impressions 11 may be formed in the upper surface 6. As can be better seen from FIGS. 4a to 4c the body may be composed of an outer shell 12 of reinforced plastic, or fibreglass, which is filled with a foamed plastic infill 13 of polyurethane or a sheet of polyethylene, or similar material. One suitable material is a polyethylene foam sponge sheet sold as "Softlon" and distributed by Wrightcel Limited and which has been cut to size. A waterproof padding layer 14 may be bonded over the exposed upper surface of the infill 13. The foamed plastic infill 13 may be either formed in situ, or applied in slab form. The gunwale 8 may be provided with hand grips or ropes (not shown) for engagement by the rider kneeling or seated upon the surface 6. In a preferred form the shell 12 is provided with a peripheral inturned rim 12A which forms the protruding gunwale 8 and is downwardly directed inwardly thereof to enclose the marginal edge portion 13A of the infill 13.

It is a feature of this invention that the bottom 7 incorporates guiding ribs, or fins, 15. With specific reference to FIG. 3 and FIGS. 4a to 4c, it will be noted that the bottom 7 comprises a longitudinally extending medial portion 16 which is substantially flat over most of its length when viewed in cross-section and laterally bordered by parallel protruding ribs, or fins, 17. The ribs 17 commence adjacent the forward end 9 as generally rectangular shaped protuberances and each becomes progressively more peaked towards its rearward end only on that one of its outer longitudinal edges remote from the other of the ribs 17. Lateral flanks 19 and 20 at opposite sides of the medial portion 16 are upwardly and outwardly inclined, and having preferably a flat base surface over most of their lengths, to meet the outer edge of the gunwale 8. A series of arcuate ribs 21 and 22 are provided in each of the flanks 19 and 20. Both the medial portion 16 and the flanks 19 and 20 curve at their forward ends upwardly towards the end 9 to adjoin the lower edge of the gunwale 8. Each of the two series of arcuate ribs 21 or 22, are provided as a plurality of arcs of reducing radius as they approach the lateral edge 23 of the toboggan 5. They are preferably in parallel and the peak of their arcs is directed towards the medial portion 16 and is less prominent from the surface of the respective flank 19 or 20 towards the forward end of the arc. At the rear 22A of each rib 21 or 22 it is tapered away, and the ribs 17 have a chamfer 17A, to form a lead-on to permit drawing of the toboggan in reverse.

It has been found that good steering is achieved with the base surface of the flanks 19 and 20 flat and each inclined from the plane of the medial portion 16 by from 10° to 25°. Also best results appear to be obtained when the arcs of the ribs 21 and 22 are part circumferences of concentric circles. An advantage found in deep snow conditions results from forming the ribs 17 sharper towards the rear 10 of the toboggan 5.

In use a tobogganist will preferably kneel, or may be seated, upright upon the surface 6 when it is intended that the motion of the vehicle is to be in a direction directly forward. If it is intended to veer, or steer, the toboggan 5 to the right side of a directly forward line, he will transfer his weight to the right-hand side of the upper surface 6 so that the toboggan 5 is tilted whereby the flank 20 approaches the ground to enable all of the arcuate ribs 22 to engage successively with the snow. With progressive leaning in the right-hand direction all of the ribs 22 will bite deeper into the snow with greater influence imposed by the ribs 22 and less by the in-line rib 17 on that side. It seems that all ribs 22 contribute some turning effect. The more the ribs 22 become embedded into the snow the sharper the vehicle will veer to the right, thus providing the rider with a relatively fluid steering control. By transference of the riders weight to the left the toboggan may be caused to veer to the left-hand side of a directly forward line. Due to the inclination of the flanks 19 and 20, when the toboggan 5 is progressing directly ahead only the medial portion 16 and bordering ribs 17 will be in engagement with the snow, or other surface.

Whereas a preferred embodiment has been described in the foregoing passages it should be understood that other forms, embodiments and modifications are possible within the scope of this invention.

What I claims is:

1. A hand-toboggan having a body with an upper surface for supporting a rider, an outwardly dished bottom on the body which includes a longitudinally extending medial portion having a spaced pair of substantially longitudinally extending protruding ribs, and opposite lateral flanks upwardly inclined from the plane of said medial portion, said hand-toboggan being characterised in that each of said protruding ribs is of substantially rectangular cross-sectional shape near its forward end and becomes progressively more peaked towards its rearward end only on that one of its longitudinal outer edges remote from the other of said ribs, and one or more arcuate protruding ribs are provided in each of said flanks which curve from their ends inwardly towards said medial portion, to enable the tobogganist to steer in one direction or another by transferring his weight to an appropriate side of said toboggan.

2. A hand-toboggan as claimed in claim 1, characterised in that there are three of said arcuate ribs in each of said flanks, and said arcuate ribs are curved to correspond to part only of the circumference of respective ones of concentric circles.

3. A hand-toboggan as claimed in claim 2, characterised in that said arcuate ribs are more peaked adjacent said medial portion and taper away at their opposite ends.

4. A hand-toboggan as claimed in claim 1, characterised in that said longitudinally extending ribs are substantially straight and border the lateral margins of said medial portion.

5. A hand-toboggan as claimed in claim 4, characterised in that said longitudinally extending ribs taper away at their opposite ends.

6. A hand-toboggan as claimed in claim 1, characterised in that the surfaces from which said ribs protrude of said medial portion and of said flanks are substantially flat over most of their lengths, and said lateral flanks are upwardly inclined from the plane of said medial portion by from 10° to 25°.

7. A hand-toboggan as claimed in claim 1, characterised in that said bottom of the body, including said medial portion and said lateral flanks, curves upwardly at a forward end thereof.

8. A hand-toboggan as claimed in claim 1, characterised in that said body is composed of an outer shell with a peripheral return flange, and an infill enclosed about its marginal edges by said return flange to provide a deck for support of a rider.

9. A hand-toboggan as claimed in claim 8, characterised in that a raised gunwale is formed on said return flange.

10. A hand-toboggan of the type composed of an upper surface for the support of a rider and an undersurface having an upwardly curved front portion and a substantially flat principal portion, said hand-toboggan being characterised in that said principal portion of the undersurface comprises a substantially flat medial longitudinally extending part and substantially flat longitudinally extending flank parts which are upwardly inclined from the plane of the medial part, and in that a pair of substantially parallel, longitudinally extending ribs protrude from the lateral edges of said medial part, each rib of said pair being of substantially rectangular cross-sectional shape near its forward end and becomes progressively more peaked towards its rearward end only on that one of its longitudinal outer edges remote from the other rib of said pair, and at least two parallel arcuate ribs protrude from the surface of each of said flank parts and have a curvature corresponding to part of the circumference of concentric circles with said curvature being arched towards said medial part.

* * * * *